July 5, 1960

L. P. PUECHBERTY 2,943,570

MINE DEVICE WITH DOPPLER EFFECT CONTINUOUS WAVE RADAR

Filed May 14, 1958

INVENTOR
LUCIEN P. PUECHBERTY
BY
Saffitz and Gueko
ATTYS.

United States Patent Office 2,943,570
Patented July 5, 1960

2,943,570

MINE DEVICE WITH DOPPLER EFFECT CONTINUOUS WAVE RADAR

Lucien P. Puechberty, Paris, France, assignor to Societe de Fabrication d'Instruments de Mesure, Massy, France, a French company Filed May 14, 1958, Ser. No. 735,223

Claims priority, application France May 14, 1957

4 Claims. (Cl. 102—19.2)

The present invention relates to a bomb or mine device, the detecting system thereof consisting of a Doppler effect continuous wave radar of small dimensions.

Oscillation generator circuit arrangements for generating pulse-modulated or sine-modulated oscillations of ultra-high frequency are known, which comprise two oscillator circuits, one of radio-frequency and the other of pulse or quench frequency. Arrangements of this kind are also known in which the two oscillator circuits are operated by a single tube which oscillates both in radio-frequency and pulse or quench frequency. These arrangements may serve either as amplitude-modulated transmitter circuits or as superregenerative receiver circuits.

On the other hand, a phenomenon of intermodulation between the radio-frequency signal generated by an oscillator triode coupled to an antenna and a portion of that same signal reflected by an obstacle more or less remote from the antenna has also been observed: in other words, a simple oscillator triode can behave as a continuous wave radar system.

When such an obstacle is mobile, the reflected signal differs in frequency from the radiated frequency F, by a certain value ΔF which provides evidence of the above mentioned intermodulation phenomenon. The application of the Doppler principle shows that:

$$\Delta F = \frac{2vF}{c}$$

where $v$ is the radial velocity component of the moving obstacle relatively to the antenna and $c$ the speed of propagation of light.

An object of the invention is to construct a radioelectrical mine embodying a single radio-frequency tube continuous wave Doppler radar system which is triggered by objects moving at a low velocity in the immediate vicinity of the mine.

Another object of the invention is the construction of a radioelectrical mine which triggers off when one of the elements of its electrical circuit or one of the power supply sources of such circuit fails to operate: This, to provide against the risk of the device being recovered intact by hostile hands, should it be rendered harmless by a functional failure.

Another object of the invention is to provide time-delayed energizing of the radioelectrical mine, thereby ensuring a safety time margin for the mine setting personnel.

Another object of the invention is to construct a radioelectrical mine which is proof against remote triggering by the transmission of a radioelectric signal of the same frequency as its own transmitter's or by the signal radiated by another radioelectrical mine located in its vicinity.

Another object of the invention is the construction of a radioelectrical mine capable of employment as a self-contained device of long duration of operation, or to serve as a link in a protective network controlled from a central command post.

According to the invention, the radio-frequency oscillator of the radioelectrical circuit of the mine consists of a tube operating simultaneously as a modulated oscillator and as a superregenerative detector, the modulating and quench signals of the oscillator and detector respectively being a common audio-frequency signal, said audio-frequency signal having a frequency markedly higher than the estimated Doppler frequency, and said audio-frequency signal of $f$ frequency being generated by an audio-frequency generator and applied to the radio-frequency oscillator tube and to an amplifier, filter and detector network through a transformer of known balance or unbalance conditions.

When the signal of $f$ frequency present in the radio-frequency channel of the oscillator tube has a given amplitude, the portion of said signal applied to the amplifier and detector network also has a given amplitude (which may be equal to zero). When an additional fixed obstacle is present within the field of the mine, the impedance of the radio-frequency tube alters, upsetting the balance of the transformer. The amplitude of the signal of $f$ frequency applied to the amplifier, filter and detector network alters, such variation causing a variation of the signal detected by the network. When a mobile obstacle moves within the field of the mine, the signal of $f$ frequency is modulated at the rate of the Doppler beat frequency and the detected signal has the frequency of the Doppler signal.

After detection, the current corresponding to the signal of $f$ frequency is fed to a relay featuring two different windings, one of these windings being energized by a fixed compensating current. This relay controls the firing circuits of a detonator.

It can be readily appreciated that the detecting system is sensitive to both fixed obstacles which have been placed within the field of the mine at a time when such mine was not energized, and to mobile obstacles. In actual practice, the distinction of obstacles of both classes, fixed and mobile, is not necessary because the mine, which is destined to detect objects in its immediate vicinity, is set up in the absence of such obstacles. If a fixed obstacle appears within the field of the mine, such presence necessarily implies prior motion. It will be shown later that the mine can be made to differentiate between fixed and mobile obstacles through the insertion of a low-pass filter into the amplifier, filter and detector network, which network normally incorporates a bandpass filter centered on the frequency $f$. Such a low-pass filter lets through the sole Doppler frequency signal.

Provision is made for the incorporation into the system of timing devices assuring a certain delay before voltage is applied to the detonator firing circuit.

A detailed description of the invention will now be given with reference to the appended drawings in which.

Figure 1:
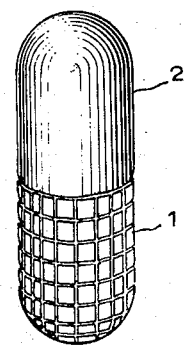
Fig. 1 is a perspective view of the complete mine device.
Figure 2:
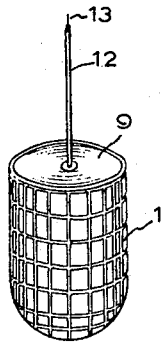
Fig. 2 is a perspective view of the mine device with its radome removed, the antenna being visible.
Figure 3:
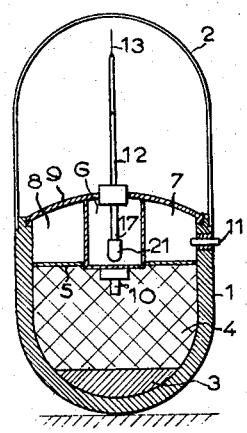
Fig. 3 shows a cross-section of the mine.

The mine of the invention has the external aspect of an oblong body comprising two cylindrical-hemispherical sections 1 and 2. Lower section 1 is made of a melted metal breaking up into a number of fragments when subjected to explosive effects and is of the type used for the fabrication of fragmentation hand grenades. Section 1 is filled, at the base with a ballast 3 of lead or of similar heavy metal and, above that ballast, with an explosive charge 4. Above that charge is fixed a metal case 5 divided into several compartments 6, 7, and 8. Compartment 6 accommodates the high-frequency unit and compartment 7 accommodates the audio-frequency amplifier, filter and detector unit as well as the trigger device of the firing mechanism. Compartment 8 accommodates the power supply source. The lower section 1 is capped with a cover 9 made of metal having good conductivity characteristics, such as aluminium, such cover having a shielding function. The lead ballast helps to maintain the device in an upright position, irrespective of mine laying conditions.

Under the case 5 and against it is fixed a detonator 10 penetrating into the explosive substance 4. Finally, the wall of compartment 7 and mine 1 has coaxial drillings to provide a passage for a push-button 11 actuating the power supply switch, as described later. The exact location of this push-button is optional and the button could equally well be mounted on cover 9.

Figure 4:
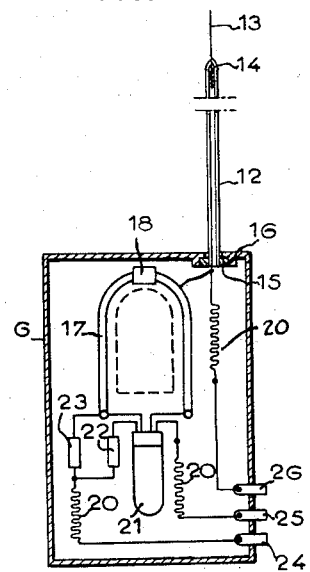
Fig. 4 shows the compartment accommodating the radio-frequency electronic circuits of the mine.

An adjustable length quarter-wave antenna 12 projects out of cover 9. This antenna is illustrated in cross-section form in Fig. 4. It consists of a silver-plated copper tube of approximately 3 mm. diameter. A stem 13 can slide within the antenna tube for the purpose of tuning the antenna circuit. When correct tuning is achieved, stem 13 is blocked in position with a drop of solder 14.

The upper section 2 of the radioelectrical mine is a simple radome. This radome is made of light plastic material, for example polythene and serves only to provide mechanical protection for the antenna 12, whenever such protection is deemed necessary. This radome can be safely dispensed with in the majority of cases.

Antenna 12 is fixed to a socket 15 fitted into a plate 16 of low-loss insulating material, such as polystyrene. The center portion of this plate is hollowed out to minimize losses within the insulating material.

The radio-frequency oscillator circuit consists of a metal loop 17, incorporating a low-loss capacitor 18, linked to the antenna by a soldered connection 19.

Coils such as 20 are radio-frequency oscillator chokes, the frequency of oscillation being in the order of several hundred megacycles per second, for example 300 mc./s.

One terminal of loop 17 is connected to the anode, the other to the grid of oscillator triode 21. Item 22 is a capacitor and 23 a resistor forming the R-C detector circuit.

The output terminals of the radio-frequency oscillator are represented by 24 and 25, for the cathode and grid respectively. 26 is the anode terminal.

Figure 5:
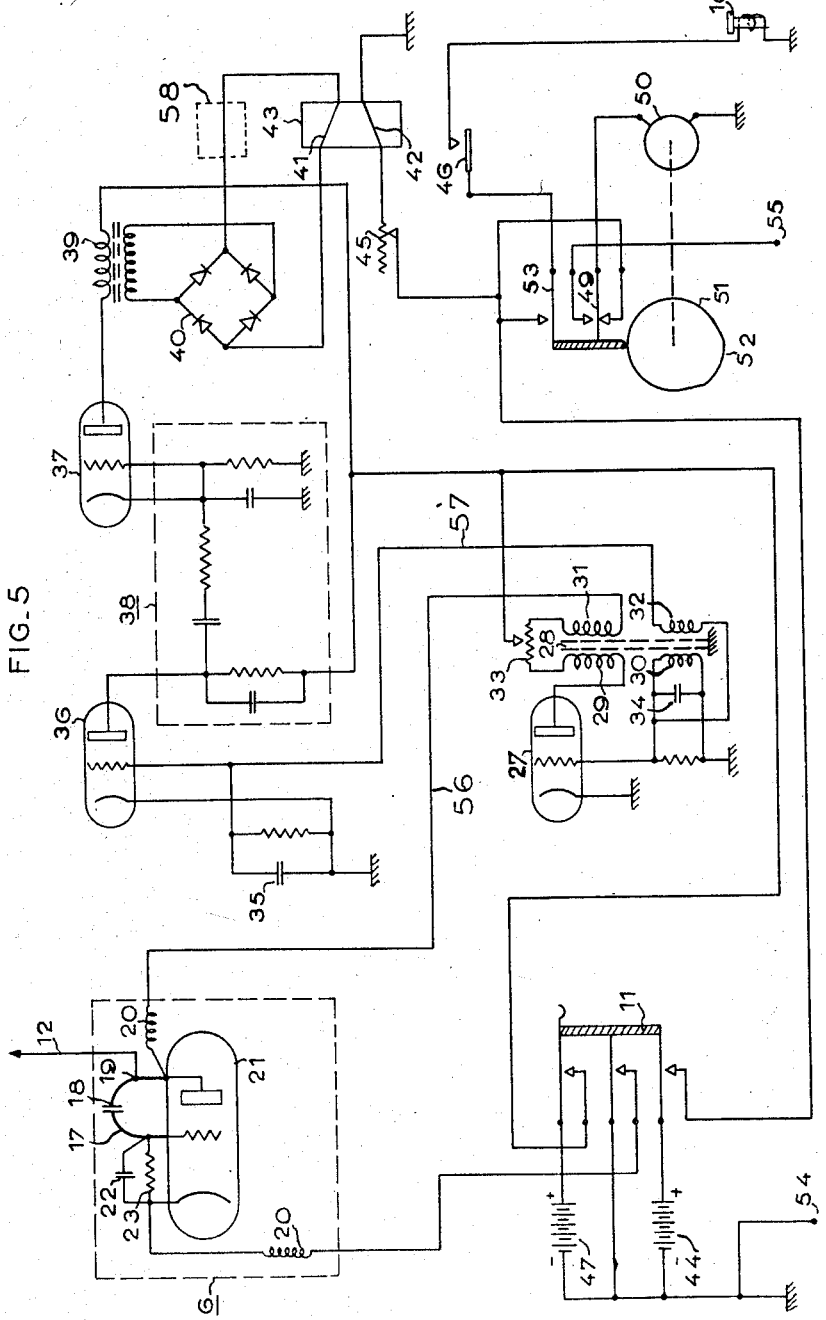
Fig. 5 illustrates a circuit diagram of the electrical elements of the mine.

These various elements are illustrated in the circuit diagram of Fig. 5. It will be observed that tube 21 operates as an oscillator of conventional type, the oscillating circuit 17—18 coupling the anode and the grid, antenna 12 being itself coupled to the inductance of this oscillating circuit. The anode circuit is energized through choke 20 by a signal of audio-frequency $f$. For the transmitter function, tube 21 operates as an oscillator tube generating a carrier signal F modulated at a frequency $f$. For the receiver function, the tube operates as a superregenerative detector, the quench frequency of which would be $f$.

The signal of $f$ frequency is provided by tube 27 which operates as a audio-frequency oscillator tube of conventional type (several hundred cycles per second, for example 800 c./s.) incorporating a transformer 28 with four windings 29, 30, 31 and 32. The windings of said transformer 28 form both a positive feed-back arrangement for oscillator 27 and a duplexer arrangement for the three following channels: ($a$) output of oscillator 27, ($b$) lead 56 and ($c$) lead 57. Windings 29 and 30 (the latter tuned to the frequency $f$) provide the coupling between the grid and the anode of tube 27. Winding 31 provides for the application via connection 56 of a signal of $f$ frequency to radio-frequency tube 21 and winding 32 is connected to the amplifier, filter and detector network via connection 57. The duplexer arrangement operates by coupling the output of oscillator 27 to radio frequency tube 21 for the signal of audio-frequency $f$, and radio-frequency tube 21 to amplifier 36 for the signals of frequency $f$ with or without Doppler effect provided by echos, audio-frequency oscillator 27 and amplifier 36 being decoupled in the balanced condition of the duplexer. In fact, as it will now be explained, a slight unbalance is given to the duplexer.

Tubes 27 and 21 are symmetrically energized, proper balance being provided by adjustment of potentiometer 33 so that the output of tube 27 approximates that of tube 21.

If this balance condition were obtainable, no current of $f$ frequency would appear at the terminals of secondary winding 32 mounted in opposition relatively to winding 30 and having an identical number of ampere-turns. Harmonics of signal $f$ are suppressed by the tuning to the frequency $f$ through capacitors 34 and 35 of windings 30 and 32.

In actual practice and for reasons stated later, a condition of slight unbalance is introduced through 33, which unbalance applies to the grid of amplifier tube 36 a voltage of $f$ frequency, which is also amplified by tube 37.

The intermediate resistance-capacity network 38 forms a band filter for the signal of $f$ frequency, in series with circuits 30—34 and 32—35 tuned to the same frequency $f$. With this arrangement, a very narrow pass-band is obtained, this result explaining why the system is quasi-insensitive to unwanted frequencies: the non-stabilized oscillator 21 constantly drifts in frequency, but such drift is small and slow and has little effect on $\Delta F$ since the beat reference frequency is F. On the other hand, it is difficult, if not impossible, to tune an unwanted frequency within the band of a few cycles-per-second width which accepts $\Delta F$ and which represents only one part in 100 million ($10^{-8}$) of F (a few cycles-per-second).

In the anode circuit of tube 37, the current of $f$ frequency, after flowing through a transformer 39, is detected by a rectifier bridge 40 and applied to the winding 41 of a relay 43.

The second winding 42 of that relay is traversed by a current supplied by a separate battery 44 via a variable adjusting resistor 45. The direction and amplitude of that current are such that they are in exact opposition relatively to the direction and amplitude of the effect of the current flowing through winding 41 when no mobile obstacles are present.

Under these conditions, when the system operates in normal manner and when no echo signal is picked up by the antenna, relay 43 is inoperative (normally-off condition).

When a portion of the reflected signal is picked up by the antenna, a beat signal $\Delta F$ is set up, modulating the signal of $f$ frequency. A state of unbalance develops between windings 29 and 31, which results in an increase or decrease, depending upon the velocity of the mobile obstacle, of current flowing through winding 41.

Relay 43 operates and, through contact 46, closes the circuit of detonator 10 which causes the charge to explode.

With this arrangement, any failure in the operation of tubes 21, 27 or 37 or of any one of their associated circuit components will, in the absence of incident signals, disrupt the balance of the currents in relay 43 and, consequently, fire the mine.

The device is energized by the action of a trip switch 11 which establishes the anode circuits of the respective tubes through battery 47, grounds cathode 21, and establishes the circuits of the motor and relays through battery 44.

Battery 47 supplies the high-tension tube voltages. Battery 44 energizes relay 43 and through the normally-on contact 49 energizes a micro-motor 50. This micromotor mechanically drives, through a reduction gear, a cam 51 shown in the non-operative position.

After a period of time which may last up to several minutes after trip-switch 11 has been actuated, the excentric section 52 initiates the operation of contact 53 which closes the circuit of detonator 10, controlled by 46, and that of contact 49 which opens the circuit of micromotor 50.

Contact 49 is set so that it opens shortly after the closing of the detonator circuit.

The activation delay provided by this arrangement leaves ample time for the operator who sets the mine to leave the danger zone.

When radar mines are integrated into a protective belt controlled by a central command post, a central batttery is connected to points 54 and 55 and energizes the micromotor 50 until contact 53 opens again, so that the device can be deactivated for tactical or technical purposes.

The circuit diagram which has been described with reference to Fig. 5 does not provide for the differentiation from mobile obstacles or fixed obstacles which may have been placed in the field prior to the energization of the mine. Such differentiation is easily achieved by placing in 58, after the detection of the signal of f frequency, a low-pass filter having a cut-off frequency of say 50 c./s. and not allowing direct current to pass.

Figure 6:
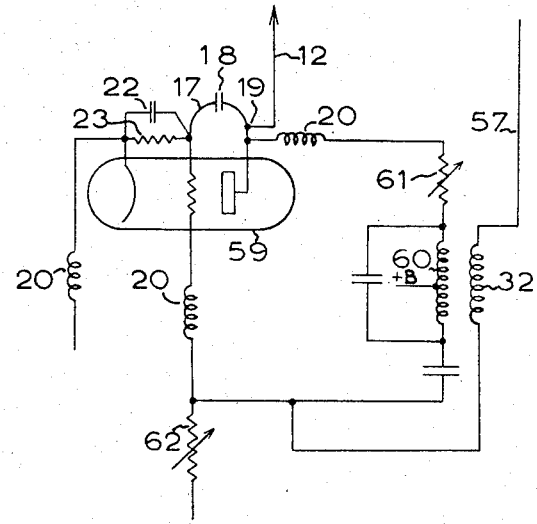
Fig. 6 illustrates the circuit diagram corresponding to the case when the radio-frequency oscillator tube and the $f$ frequency oscillator tube are combined into a single common tube.

In Fig. 5, the radio-frequency oscillator 21 and the f frequency oscillator 27 consists of two separate tubes. A known practice (see, for example, U.S. Patent 2,618,-748 issued November 18, 1952) consists in combining the two tubes into a single tube. The corresponding diagram is illustrated in Fig. 6, in which reference numerals are the same as in Fig. 5 whenever they designate the same elements. The single oscillator tube, oscillating both at radio and audio frequencies, is designated by 59. Windings 29, 30 and 31 are combined into a single autotransformer 60. Capacitor 34 cooperates with autotransformer 60. A variable resistor 61 is inserted into the anode circuit of tube 59. Grid resistor 62 is a variable resistor.

What I claim is:

1. An explosive mine detonatable by electromagnetic energy which is adapted to explode by responding to the Doppler effect frequency reflected by objects of low velocity entering the electromagnetic field of action of said mine comprising a detonator, a detonator energizing circuit adapted to fire the detonator, a firing relay which controls said detonator energizing circuit, an antenna for transmitting and receiving electromagnetic energy, a radio-frequency oscillator including an inductance connected to said antenna, said oscillator consisting of a single triode operating as both transmitter and receiver whose anode and grid are coupled to said inductance with said anode being connected through a choke to a low frequency signal source whereby as a transmitter said triode generates a carrier signal modulated by said low frequency signal and whereby said triode functions as a super-regenerative detector having a quench frequency which is the frequency of said low frequency signal, said low signal frequency source being constituted by an audio-frequency oscillator generating a signal of a frequency which is higher than the estimated Doppler effect frequency induced by objects of low velocity entering the electromagnetic field of action of said mine, a pass band amplifier and detector network in series with each other, the output of said detector network being connected to said firing relay and duplexer means having three terminals connected respectively to the output of said audio-frequency oscillator, to the input of said radio-frequency oscillator to modulate the carrier signal thereof in accordance with the low frequency signal generated by said audio-frequency oscillator and to the input of said pass band amplifier whereby the reflection of radiated radio-frequency signals by mobile objects produces a Doppler effect modulation of audio-frequency oscillations in said pass band amplifier to consecutively vary the output of said detector network and trigger said firing relay to thereby explode said mine.

2. An explosive mine detonatable by electromagnetic energy and adapted to explode by responding to the Doppler effect frequency reflected by objects of low velocity entering the electromagnetic field of action of said mine comprising a detonator, a detonator circuit adapted to fire the detonator, a firing relay which controls said detonator energizing circuit, an antenna radiating electromagnetic energy and receiving electromagnetic energy, a single triode operating simultaneously as both an amplitude modulated oscillator-transmitter and as a super-regenerative detector-receiver having an anode radio-frequency circuit connected to said antenna, an anode audio-frequency oscillator circuit to modulate the radio-frequency generated by said anode frequency circuit and antenna, a super-regenerative detector circuit coupled with said radio-frequency oscillator circuit which generates continuous oscillations and coupling means including chokes between said audio-frequency oscillator circuit and said radio-frequency oscillator circuit, a pass band amplifier and a detector network in series with each other having the output of said detector network connected to said firing relay and a balancing network applying a controlled part of the audio-frequency oscillation of said triode to said pass band amplifier, the frequency of said audio-frequency oscillator circuit being higher than the estimated Doppler frequency induced by objects of low velocity entering the electromagnetic field of action of said mine, whereby beat signals between transmitted oscillations and received oscillations due to the Doppler effect modulate said audio-frequency oscillation in said pass band amplifier and consecutively vary the output of said detector network to trigger said firing relay and explode said mine.

3. An explosive mine according to claim 1 comprising a main power source energizing said radio-frequency oscillator, audio-frequency oscillator and pass band amplifier and an auxiliary adjustable power supply device, in which said firing relay comprises two opposite windings, the first of said opposite windings being connected to said detector network and the second of said opposite windings being connected to said auxiliary adjustable power supply device whereby the setting of said auxiliary power device maintains said firing relay in inoperative condition when the output of said detector network corresponds to the controlled part of said audio-frequency oscillations which are applied to said pass band amplifier and whereby said firing relay is triggered to explode the mine when th e main power source or a circuit element between said source and firing relay is interrupted.

4. An explosive device according to claim 2 comprising a main power source energizing said single triode circuits and pass band amplifier and an auxiliary adjustable power supply device in which said firing relay comprises two opposite windings the first of said opposite windings being connected to said detector network and the second of said opposite windings being connected to said auxiliary adjustable power supply device whereby the setting of said auxiliary power device maintains said firing relay in inoperative condition when the output of said detector network corresponds to the controlled part of said audio-frequency oscillations which are applied to said pass band amplifier and whereby said firing relay is triggered to explode the mine when the main power source or a circuit element between said source and firing relay is interrupted.

(References on following page)

References Cited in the file of this patent

UNITED STATES PATENTS

| | | |
|---|---|---|
| 2,071,933 | Miessner | Feb. 23, 1937 |
| 2,411,787 | Hammond | Nov. 26, 1946 |
| 2,428,297 | Seeley | Sept. 30, 1947 |
| 2,760,188 | Guanella et al. | Aug. 21, 1956 |

FOREIGN PATENTS 109,086   Sweden _____ Nov. 16, 1943

OTHER REFERENCES

Article entitled "Proximity Fuzes," by H. Selvidge, February 1946 edition of Electronics Magazine, pages 104 to 107. (Copy can be found in 102–70 2P.)